June 12, 1956  R. H. EBSWORTH  2,749,767
POWER TRANSMISSION
Filed Jan. 2, 1951  4 Sheets-Sheet 1
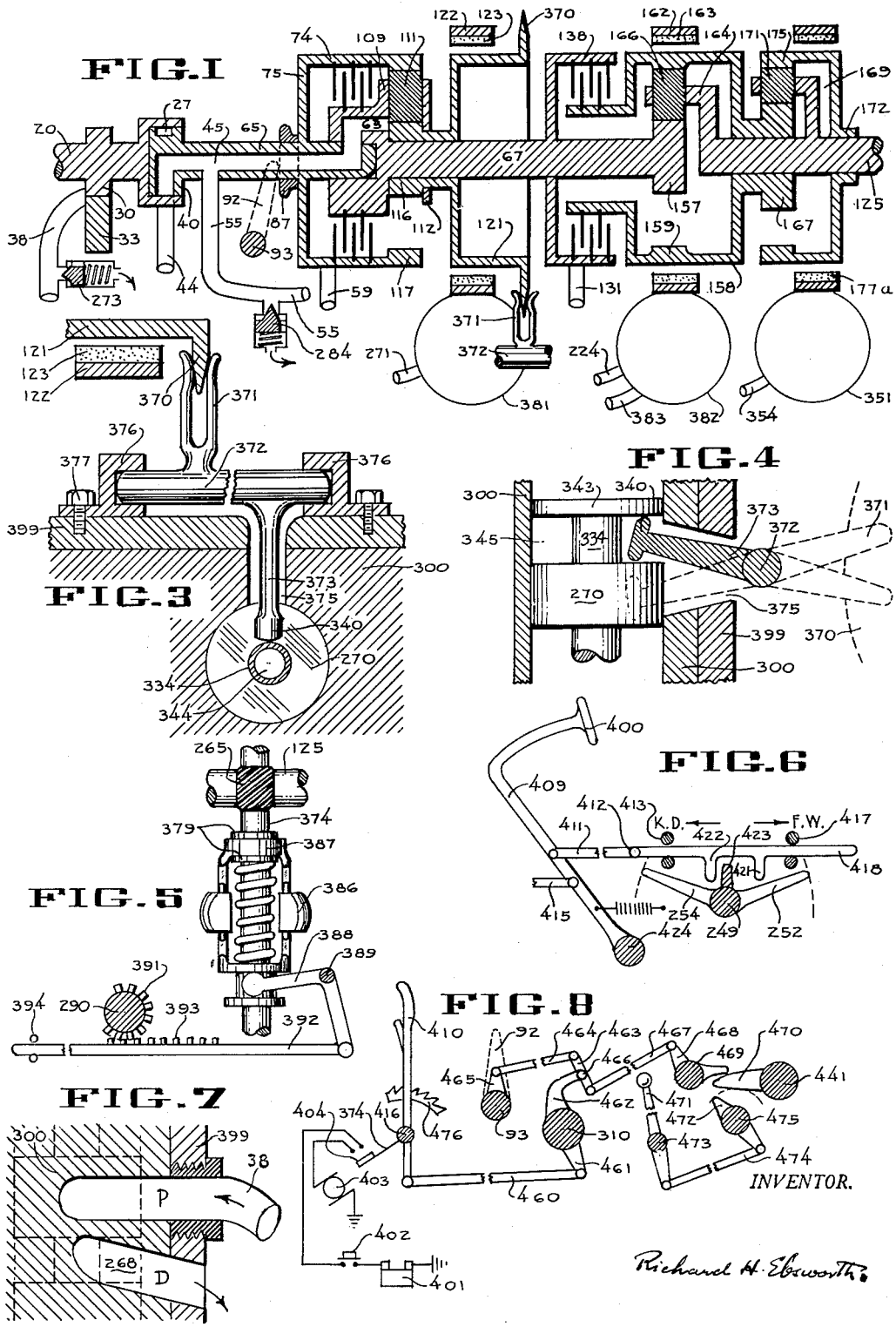

June 12, 1956 R. H. EBSWORTH 2,749,767
POWER TRANSMISSON
Filed Jan. 2, 1951 4 Sheets-Sheet 2
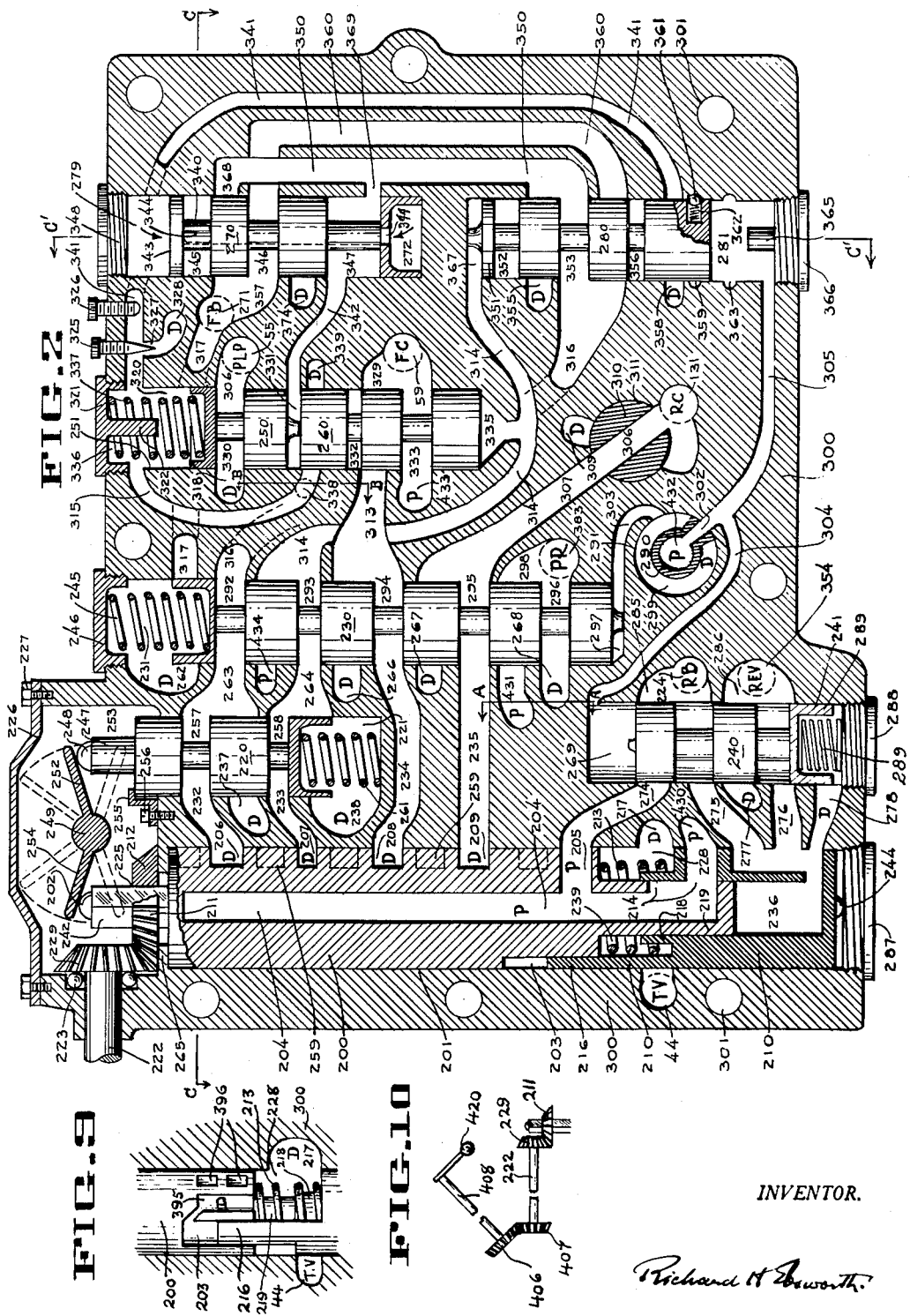
INVENTOR.
Richard H. Ebsworth

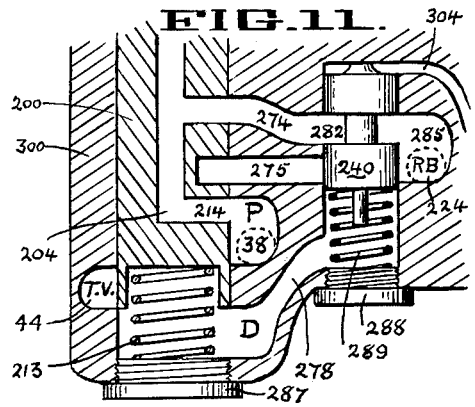
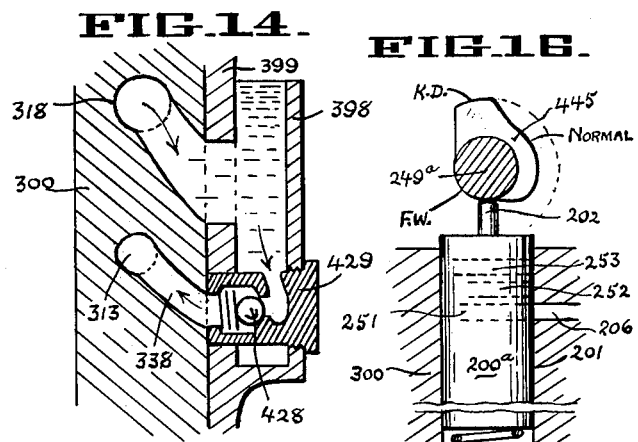
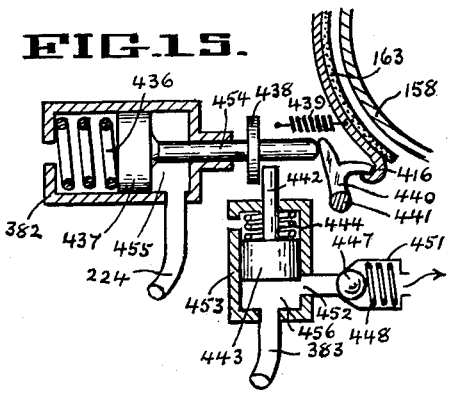

June 12, 1956  R. H. EBSWORTH  2,749,767
POWER TRANSMISSON
Filed Jan. 2, 1951  4 Sheets-Sheet 4
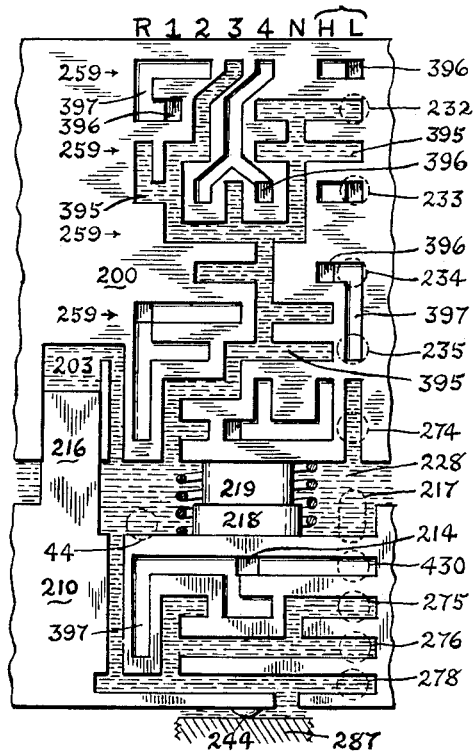
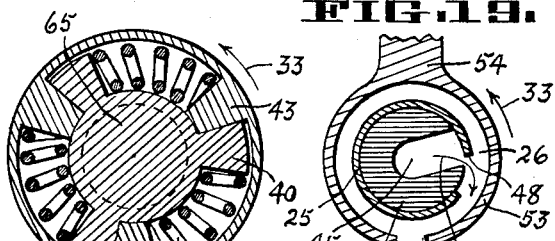
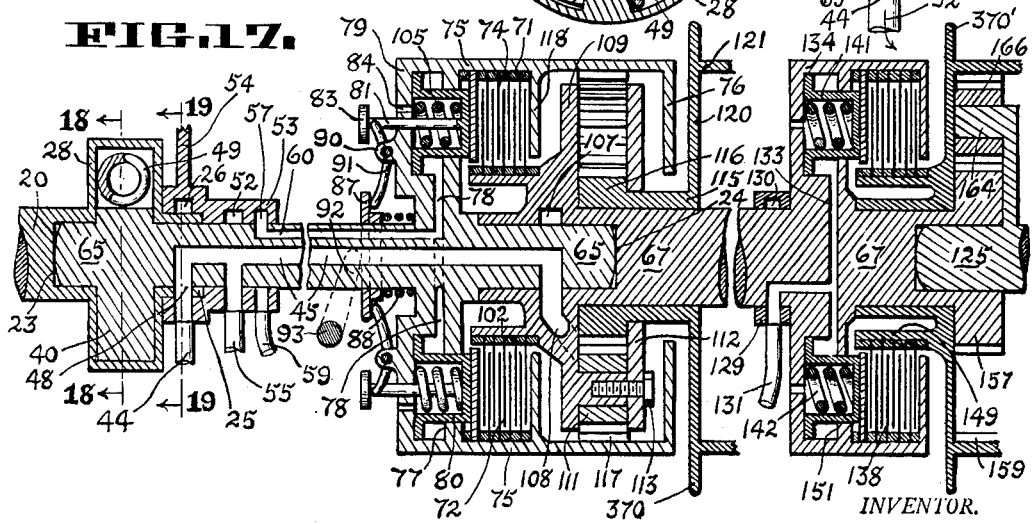
INVENTOR.
Richard H Ebsworth

United States Patent Office 2,749,767
Patented June 12, 1956

2,749,767

POWER TRANSMISSION

Richard Henry Ebsworth, Laguna Beach, Calif.

Application January 2, 1951, Serial No. 204,000

34 Claims. (Cl. 74—472)

This invention relates to power transmissions, more particularly in motor vehicles, and of the kind wherein planetary gears are used to provide a number of gear ratios while the gears remain constantly in mesh, and especially to a transmission which includes automatic mechanism serving to furnish an infinite range of gear ratio between the driving and the driven shafts.

The invention is especially concerned with the control system for such a transmission, which, in a preferred form, comprises a front planetary assembly, gears in which are enclosed to form a controllable pressure pump, a rear planetary assembly, front and rear brakes, front and rear clutches, a drive shaft, an intermediate shaft and a driven shaft.

The front clutch directly connects the drive shaft to the intermediate shaft, while the rear clutch serves to connect the intermediate shaft to the driven shaft by locking the members of the rear planetary assembly. Both clutches are spring-biased to the engaged position in the normal condition.

The front brake is normally spring-biased to the disengaged position and is hydraulically applied to hold a gear in the front assembly stationary to act as a reaction gear. The rear brake is normally spring-biased to the applied position to hold a gear in the rear assembly stationary to act as a reaction gear and restrained from engagement by hydraulic pressure. Provision is also made for the holding of a gear member in the rear assembly stationary to furnish reverse drive.

In recent constructions, automatic transmission tends to the use of a torque converter, with planetary gears to provide a low ratio drive. This however means an appreciable increase in both cost and weight and the invention seeks to provide a transmission in which planetary gears furnish a flexible and easily controlled mechanism without the use of a fluid coupling or converter.

It is a feature of this invention that control means are provided for producing automatic change of gear ratio in response to the torque applied to the driven shaft which mechanism includes a pump and means to lessen the resistance to the discharge from said pump in step with an increase in the torque transmitted.

It is a further feature that gear members in the front planetary gear assembly are utilized to provide the resistance pump; said members being fitted with a casing and performing their pumping function without the use of any cooperating gears external to the said casing.

The invention also contemplates the use of a simple set of valve control mechanisms which are easily serviced and provide an efficient and improved regulation of the various parts of the planetary transmission. In a preferred form these valve mechanisms are grouped together in a plate or block which may be easily detached from the transmission casing and if desired replaced by an entirely new unit.

Another object is to provide that the manual control may be moved into any position, at any speed of the vehicle, without damage of any kind occurring in the transmission.

A further object is to furnish a smooth start with "clutch effect" in any gear setting and to make the change between first gear and reverse a simple one, not calling for special handling of the control on the part of the operator.

An object of the invention is to provide an automatic change into high gear when the vehicle exceeds a predetermined speed, e. g., 50 M. P. H. A change-down is also provided automatically from one gear ratio to the next lower gear ratio if the operator fully depresses the throttle accelerator pedal at any speed lower than 50 M. P. H.

Still another object is to provide an electric switch in the circuit to the electric starter which is opened when the hand brake is released and closed when the hand brake is applied, thus serving to provide a safety factor, in that, as the hand brake in the invention is arranged to mechanically disengage the front clutch when applied, the engine can only be started when the said engine is in a condition of free-wheeling.

A further object is to eliminate the conventional clutch pedal while providing that, if the speed of the vehicle is below 50 M. P. H. the throttle accelerator pedal may furnish a free-wheeling condition of the engine when the said throttle is fully released, and may furnish a kick-down from one gear ratio to the next lower gear ratio when said throttle pedal is fully depressed. It is also arranged that said free wheeling and said kick-down are operative independently of any gear setting that may be selected by the handle control.

Between the fully released and fully depressed positions of the said accelerator pedal the gear as set by the handle is made effective and in free-wheel the gear may be pre-selected. The pre-selected gear will then become operative when the throttle is depressed. As the free-wheel and kick-down are only operative at the extreme ends of the throttle range there does not exist the need for fine adjustment that is usual in the current transmissions.

Another object is to provide a master gear-regulating valve with dual function which may be given a rotary setting by the operator from the control handle and a reciprocated one through the use of the accelerator pedal.

In the specification the terms "gear-lock" and "gear-locking" are used to indicate the restriction of the flow of fluid from the outlet of the fluid pump formed by enclosing gear members in the planetary gear assembly previously described.

An important feature of the invention is to provide means whereby said gear-locking is employed to bring a drive shaft and a driven shaft to practically the same speed of rotation before clutching mechanism serving to connect the said shafts for unitary rotation becomes operative, thereby reducing the wear on said clutch to a minimum. At the same time another important object is to use the said gear-locking to check the rotation of a brake drum and to utilize a reversal of the drum rotation to cause application of the brake when the said brake drum is practically stationary, thus reducing the wear on the brake to a minimum.

Another object is to provide a centrifugally operated mechanism serving to furnish a control in a low range when the speed of the vehicle does not exceed e. g. 3 M. P. H., and a control in a high range when the speed exceeds 50 M. P. H. and to so arrange said mechanism that it does not call for fine adjustment and does not prove faulty in its operation.

The invention also aims to provide valve means for gear control which would not be sensitive to the rough jarring usual in heavy vehicles. This feature added to the wear-saving action of the gear-locking and the absence of unusual heat production would make a reliable and long-lasting transmission suitable for the demanding requirements of a military tank.

Other objects, advantages and features include: the use of only two brake bands for forward drive while at the same time one of these bands takes the place of the hand brakes, as used with a conventional gearbox; a single pump suffices for the supply of fluid pressure where two are commonly used, and relief is provided for that pump in top gear to reduce the drag on the transmission; a positive neutral with no creeping; a choice of four fixed ratio gears for forward drive or for hill-breaking; an automatic drive with infinite gear ratio by simply moving the handle control; provision for a push or pull start at a very low speed and for towing with a perfectly free engine; an automatic brake which is inescapably applied when pressure from the engine-driven pump is no longer operative, no matter what the position of the controls, thus removing the need for a special "parking" position of the operator's handle; a top gear in which a direct drive is obtained without slip; a brake which is automatically applied when the handle is placed in neutral, serving to hold the car stationary on the most severe grade in either direction; simple controls not subject to seizure or mechanical failure and not dependent on opposing fluid pressures acting simultaneously for their operation; provision for the lock-out of reverse when the car is going forwardly at more than a pre-determined low speed while the speed in reverse is not limited in any way; there is no need for a specially large engine, as is becoming common practice, because four gears are available, and it is also possible for the same reason to fit a higher ratio of drive in the differential; the provision of a hand brake which, while using a brake band that is also used to provide a gear ratio in ordinary driving, acts in the conventional way, over-riding any gear setting that may be provided by the controls; a transmission which does not call for special cooling because undue heating is not present; a transmission which does not require electric solenoids, vacuum connections, or the presently used accumulator for the control of the brakes and clutches therein; and a transmission which does not call for a specially sensitive governor and does not transmit torque with the aid of a one-way detent such as a ball or roller mechanism.

This invention is a continuation in part in an improvement upon my co-pending application for Power Transmission, Serial No. 148,227, filed in the United States Patent Office, March 7, 1950, now Patent No. 2,731,848.

These and other features, objects and advantages will be apparent from the annexed specification in which, in the drawings:

Fig. 1 is a vertical diagrammatic section of a form of transmission suitable for use with the controls shown in Fig. 2.

Fig. 2 is a vertical sectional view of a detachable block serving to house the various valve mechanisms which co-operate with the connections shown in Fig. 1.

Fig. 3 is a horizontal section through C—C in Fig. 2, depicting a mechanical connection between a brake drum and a co-operating valve control.

Fig. 4 is a vertical section at C'—C' in Fig. 2, of a portion of the valve mechanism shown in Fig. 3, operated by shaft 372 and drum 121.

Fig. 5 shows centrifugal mechanism serving to operate valve 290 in Fig. 2.

Fig. 6 is a plan view showing the operator's accelerator pedal and its connection with the kick-down and free-wheel operations of valves 200 and 220 in Fig. 2.

Fig. 7 is a vertical section through A—A in Fig. 2 showing two conduits, 431 and 268, serving to indicate the general arrangement of drain and power supply throughout block 300.

Fig. 8 is a schematic showing of the hand brake and its connections with the electric starter, front clutch and rear brake.

Fig. 9 is an elevation showing a method of operatively connecting the two parts of selector valve 200 for unitary rotation and relative longitudinal movements.

Fig. 10 is a diagram showing the connection of the operator's handle with the selector valve 200.

Fig. 11 is a modified construction of the selector valve 200 suitable for use when the reverse control is mechanically operated.

Fig. 12 is a plane projection indicating the arrangement of the drains and power supply slots and ports in selector valve 200.

Fig. 13 is a control diagram showing the provision of power and drainage furnished to the various controls in the different gear settings of the selector valve.

Fig. 14 is a section along B—B in Fig. 2 serving to show the oil supply to dashpot 336 through a one-way conduit 338.

Fig. 15 is a layout, partly in section, of the power relief mechanism in its connection with the rear brake.

Fig. 16 shows kick-down, normal gear and free-wheel included in the one valve operated by a triple-elevation cam.

Fig. 17 shows in detail the construction of the torque valve, the front clutch and the rear clutch shown diagrammatically in Fig. 1.

Figs. 18 and 19 are vertical sections along the lines 18—18 and 19—19 in Fig. 17.

Referring now more particularly to the drawings:

In the specification the term "line" is used to indicate a conduit which serves to convey fluid pressure to, or drainage from, the various controls. In Fig. 2 the abbreviation, F. C. indicates a connection to the front clutch line 59. (Fig. 1) F. B. is a connecting line to the front brake line 271. R. C. is a connection with the rear clutch line 131. R. B. indicates a connection with the rear brake line 224. REV. is a line connecting with the reverse line 354. P. indicates a line receiving fluid pressure from pressure pump line 38 in Fig. 1. P. R. is a connection with the power relief line 383. Pl. P. indicates a line connecting with the planetary pump outlet line 55. T. V. indicates a connection allowing escape for the torque valve line 44. D. serves to indicate a drain line allowing the return of oil to an oil-collecting reservoir or to the sump of the transmission casing.

Fig. 1 shows in diagrammatic form a transmission suitable for use with the control system shown in Fig. 2. It is provided with four shafts, a first drive shaft 20, a second drive shaft 65, an intermediate shaft, and a driven shaft 125. Shafts 20 and 65 (see Figs. 18 and 19) are allowed slight relative movement and are spring-biased to form a torque-responsive valve with an outlet to line 44 from the discharge line 45 of the planetary pump formed by the gears 111 and 116. Normally said outlet is closed and the degree of opening depends on the amount of torque passing from portion 20 to portion 65. Where the torque valve is not used in the design, shafts 20 and 65 form simply one shaft.

Two planetary gearsets are incorporated for forward drive. A front gearset is formed by the ring gear 117, planets 111 and a sun gear 116. A rear gearset is formed by a ring gear 159, planet gears 166 and a sun gear 157. An extra gearset to the right of the rear gearset to provide reverse is formed by ring gear 175, planet gears 171, and a sun gear 167.

A front clutch indicated by 74 serves to connect the drive shafts 20—65 to the intermediate shaft 67.

A rear clutch indicated by 138 serves to lock the sun gear 157 to the ring gear 159 and thereby to connect the intermediate shaft 67 to the driven shaft 125 for unitary rotation. Both clutches are spring-biased to engagement and disengaged by fluid pressure, applied to the front clutch by line 59 and to the rear clutch by line 131. The front clutch may also be disengaged mechanically by rocker 92 fulcrumed at 93 and actuating a collar 87 (see also Fig. 17).

The sun gear 116 and planet gears 111 of the front gearset are enclosed by plate 112 and extension 109 of intermediate shaft 67 to form a fluid pump. This pump has a bored outlet 63 leading to line 55 which is provided with a relief valve 284.

For reduced gear ratio, the sun gear 116 which is integral with brake drum 121 may be held stationary by brake band 123. For gear reduction in the rear gearset, ring gear 159 may be held by brake band 163 applied to the ring gear casing 158. The brake band 162 will hereafter be referred to as the rear brake. The reverse ring gear 175 is held for reverse drive by the brake band 177a.

Brake drum 121 is fitted with a flange 370 which is embraced by prongs 371 on shaft 372 for the actuation of the front brake as hereafter described.

The front brake operating cylinder 381 is actuated through line 271, the rear brake cylinder 382 is actuated by line 224 and reverse cylinder 351 is actuated by line 354. Line 383 for power relief in top gear will be described later.

In Fig. 17 a first drive shaft 20 cooperates with a second drive shaft 65 to form a valve 48. Shaft 20 is expanded into a casing 28 and fitted with inwardly extending bosses 43 which through springs 49 transmit torque to the outwardly extending bosses 40 carried by shaft 65. At its forward end shaft 65 closely fits in a bore 23 in shaft 20 and at its rear end is integral with the clutch casing 75 and closely fits in a bore 24 in the intermediate shaft 67. Through springs 49 shafts 20 and 65 are allowed slight relative movement and as torque is increased the torque valve 48 is opened to permit increased escape of fluid from a central bore 45 which is the outlet for the planetary pump formed by enclosing the sun gear 116 and the planet gears 111 of the front planetary set. A collar 53, held from rotation by arm 54 attached to the gearbox, serves for the attachment of the outlet conduits 44 and 55 of the planetary pump, and to attach the front clutch controlling line 59.

Collar 53 is fitted with annular slots 26, 52 and 57 which serve to provide permanent communication between the bore 45 and the conduits 44 and 55 and between the bore 60 and the clutch-releasing line 59. The bore 60 in shaft 65 opens through cross bores 78 to the cylinders 77 which are formed in the casing 75 and house the hollow pistons 80 which are biased by their contained springs 105. Front clutch 74 is fitted with plates 71 supported by casing 75 and plates 72 carried on a cylindrical extension 102 on the head of the intermediate shaft 67. Springs 105 tend constantly to engage the clutch plates 71 and 72 in cooperation with a rear clutch wall 118 extending inwardly from casing 75. The clutch 74 is freed by fluid pressure in cylinders 77 applied through conduits 59, 60 and 78.

Pistons 80 are fitted with central shaft 81 extending through casing wall 79 and ending in a collar 83. Leak holes are bored in wall 79 at 84. Shaft 65 carries a slidable collar 87 biased by spring 88 and operated by yoke 92 carried on cross shaft 93 which is connected with the hand brake. Levers 91, pivoted on brackets 90 extending forwardly from wall 79, bear by a short end against piston collars 83 and by a long end against sliding collar 87. Clockwise rotation of shaft 93 and its yoke 92 causes levers 91 to draw pistons 80 forwardly against springs 105 for the disengagement of the front clutch.

The head 109 of shaft 67 forms a plate which cooperates with a plate 112, attached to its by studs 113, to enclose the sun gear 116 and the planet gears 111 to form the planetary pump which forces fluid through a bore 108 and an annular slot 107 to the outlet bore 45. An inwardly extending wall 76 carried by casing 75 helps to form a trough to keep the planetary pump supplied with oil. Collar 115 supported on shaft 67 is integral with sun gear 116 and plate 120 which carries the brake drum 121 fitted with brake reversal flange 370. Said brake "reversal" will be described later.

In the rear planetary unit a casing 134 is carried by shaft 67 and is bored to form cylinders 151 which contain hollow pistons 141 which house springs 142 in a construction similar to that of the front clutch. The rear clutch 138 is freed by pressure in cylinders 151 applied through bores 133 and conduit 131 which is attached to nonrotating collar 129. The annulus gear member 159 of the rear assembly may be fitted with a flange 370′ if the brake reversal feature is used in connection with the rear brake.

Arrows 32 in Fig. 19 indicate the course taken by the oil escaping through the torque valve 48. Arrows 33 indicate the rotation.

Fig. 2 shows a sectional view of a block or plate which serves for the housing of the various control valves which cooperate with a transmission of the type shown in Fig. 1 and Fig. 17. The valves according to their functions will be referred to as follows:

Valve 200 is the "selector valve"; valve 220, the "freewheel" valve; valve 230, the "high" valve; valve 240, the "low" valve; valve 250, the "brake gearlock valve"; valve 260, the "clutch gearlock" valve; valve 270, the "reversal" valve; valve 280, the "re-set" valve; valve 290, the "centrifugal" valve; and valve 310, the "hand-brake" valve.

A block 300, attached by bolts 301 to the transmission casing 399 (see Fig. 3), serves to house the valves described. In a cylinder 201 bored in block 300 valve pistons 200 and 210 are rotatable by shaft 222 supported by ball-race 223 and operating through bevel gear 229 and 211, the latter being shown partly sectioned at 212. Shaft 222 is connected with the operator's handle 420 through bevel gears 406 and 407 and shaft 408 (Fig. 10). Chamber 253 which houses gears 229 and 211 is closed by a plate 226 attached to block 300 by studs 227. Gear 211 has a squared central bore 225 which closely embraces a squared extension 242 integral with the selector valve 200 and fitted with a rounded end 202.

A shaft 249 is transversely supported by block 300 and is fitted with a vertical extension 423 (Fig. 6) and arms 252 and 254. Shaft 249 is rotatable in either direction by bosses 321 and 322 carried on rod 418 which operates in supports 413 and 417 on block 300, rod 418 being connected through hinge 412 and link 411 to the shaft 409 of foot pedal 400 which is fulcrumed at 424 and connected to the carburetter through link 415.

Arm 254 operates against rounded end 202, when throttle pedal 400 is fully depressed, to move selector valve downward against the resistance of spring 213 which biases valve member 210, to bear through pin 244 against screw plug 287, and valve member 200 upwardly against shoulder 265 on block 300.

Valve 200 is fitted on its outer surface with a slot 203 which closely embraces a vertical extension 216 integral with valve member 210, serving to cause valve members 200 and 210 to rotate together while leaving valve 200 free to be operated vertically.

Selector valve 200 is fitted with a central bore 204 which receives fluid pressure through port 214 from a power line 430 connected with outlet 38 of the engine-driven pump formed by gears 30 and 33 (Fig. 1). Valve 200 is fitted with drainage slots such as 206, 207, 208 and 209, which are shown connected in Fig. 12 and indicated generally therein by the numeral 395. These slots 206—209 are drained by the escape outlet 278 to the transmission casing (Figs. 12 and 14). Valve 200 is also provided with various slots such as 205 which open into the central bore 204 and supply fluid pressure to lines 232, 233, 234, 235 and 274 in the different gear settings of selector valve 200.

Valve 200 has a cylindrical extension 219 at its lower end which is close-fitting in a bore 236 of valve 210 which is prolonged upwardly in a collar 218. A port 214 opens bore 204 permanently to power line 430 in any position of valve 200 as it is moved up or down by spring 213 or arm 254 respectively. The numeral 259 indicates the levels of the ports and slots which become operative when a kick-down gear change occurs.

Valve 210 undergoes rotary movement only, but valve 200 is both rotary and reciprocating.

Valve 200 is connected by lines 232 and 233 with valve 220 which from its function will be termed the "free-wheel" valve. It is also connected by lines 234 and 235 with valve 230, which from its function will be referred to as the "high" valve, since it becomes operative by fluid pressure in chamber 297 through line 303 from centrifugal valve 290 when the speed of the vehicle reaches 50 M. P. H., valve port 302 being opened at that speed to line 303.

Valve 200 is also connected by line 274 to valve 240 which from its function will be called the "low" valve, since it is actuated downwards by fluid pressure in chamber 269 through line 304 when the engine starts running and returns to its original position when centrifugal port 302 closes at car speed of 3 M. P. H.

Free-wheel valve 220 is a piston in cylinder 221 bored in block 300 and normally biased by spring 261 to abut against bracket 255 attached to block 300 by studs 256. Valve 220 is moved downward by arm 252 when the throttle pedal 400 is fully released and through link 411 and rod 418 with its boss 422 (Fig. 6) bears against the extension 423 to rotate the arm 252 in a clockwise direction.

To the left in the drawing, valve 200 opens drainage, in the Automatic gearsetting, from chamber 228 through port 259 to line 44 which is the outlet of the torque valve formed between shafts 20 and 65 in Fig. 1.

Valve 220 is fitted with an upward extension 247 which has a rounded end 248 which is contacted by arm 252 in its clockwise rotation. On the one hand valve 220 is connected with valve 200 by lines 232 and 233 and with drain lines 237 and 238, and on the other hand with lines 263 and 264 to high valve 230. Valve 220 is also fitted with annular slots 257 and 258.

Valve 240 is a piston, housed with spring 289 in a cylinder 241 bored in block 300, and is fitted with annular slots 282 and 283 and connects on the left with valve 200 by line 274, also on the left with two drain lines 277 and 278 and by lines 275 and 276 with valve 210. On the right, valve 240 connects with a recess 285 and line 224 to the rear brake cylinder 382 (Fig. 1) and with a recess 286 and line 354 to the reverse brake actuating-cylinder 351. The upper end 269 of cylinder 241 receives fluid pressure from centrifugal valve 290 through port 302 and line 304 up to a speed of 3 M. P. H. when line 304 becomes open to drain 299.

Fig. 16 is a diagram to indicate how the rotary and reciprocating valve 200, the rotary valve 210, and the free-wheel valve 220 may be combined in a single valve 200a reciprocated by a cam 445 having a low operating edge for free-wheel, an intermediate edge for normal gear setting, and a high edge for kick-down gear change. The levels of the ports and slots for gear operation are shown as dotted lines. The free-wheel series is indicated at 251, the normal gears at 252, and the kick-down at 253. Suitable means (not shown) may be provided for the rotation of cam 445 needed for normal gear setting. On Fig. 2 two lines 274 and 275 for the rear brake control are fitted so that, in the neutral position, the rear brake 162 may be applied through line 275 if the speed is below 3 M. P. H. but if the handle control were inadvertently moved into the neutral position at substantial speed the rear brake would receive pressure through line 274 and be held from engagement, thus providing an important safety feature.

Fig. 11 shows an alternative construction of valves 200, 210 and 240 which is specially suitable when the reverse pawl or brake band is applied mechanically, as is common present practice. In this case, valve 210 is eliminated and line 275 connected with valve 200. Valve 240 is fitted without slot 283.

In the preferred form of transmission shown in Fig. 1 a free engine calls for disengagement of the front clutch and the front brake and so free-wheel valve 220 operates to control only these members but the control thus provided over-rides any gear setting they may be given by selector valve 200.

When free-wheel valve 220 is moved downwardly by the clockwise rotation of arm 252, slot 257 opens front brake line 263 to drain 237, and gearlock line 314 becomes connected through slot 258 with drain 238 so that no matter what the setting of valve 200 may be, the front clutch is disengaged by pressure and the front brake by drainage.

Valve 230 is a piston, housed with spring 245 in a cylinder 231, bored in block 300 and closed by screw plug 246. It has annular slots 292, 293, 294, 295, and 296. It connects on the left with lines 263 and 264 to free-wheel valve 220 and by lines 234 and 235 with selector valve 200. It also connects on the left with power lines 434 and 431 and with drains 262, 266, 267 and 268.

On the right, valve 230 has a direct line 317 to the front brake line 271, a line 316 connecting with valve 280, which from its function will be referred to as the "re-set" valve, a line 314 which serves to actuate valves 260 and 280, a front clutch line 313 serving to operate what will be referred to as the "clutch gearlock," a line 307 to the rear clutch which is opened and closed by a valve 310, which will be called the "hand brake" valve, closing off power from the rear clutch when the hand brake is applied (Fig. 8). Also on the right, is a recess 298 connecting with a line 383 to the power relief mechanism (Fig. 15). The lower end 297 of cylinder 231 receives pressure from the centrifugal valve 290 whose port 302 opens to line 303 when the vehicle speed reaches 50 M. P. H. When valve 230 is actuated upwards it provides a top gear setting which takes precedence of any setting furnished by selector valve 200 or free-wheel valve 220. A speed of 50 M. P. H. is not likely in a 2nd gear setting, so, to make valve 230 as simple as possible, no provision has been made in connection with said latter valve for the control of line 274 to the rear brake hydraulic mechanism. This construction renders the automatic change into high gear operative however only when the selector valve 200 is in a 3rd gear setting in which line 274 is powered to keep the rear brake disengaged.

Valves 250 and 260 are pistons housed with spring 337 in cylinder 320 bored in block 300. Between the two valves is chamber 331 which receives fluid pressure through line 342, slot 347, port 369 and line 350 to actuate valve 250 upward when a first gear setting by selector valve 200 opens power to said line 350.

Valve 250 operates independently of valve 260, connecting on the right through port 306 with planetary pump outlet line 55 (Fig. 1), which it drains through slot 330 to drain line 318.

Valve 260 is fitted with annular slots 332 and 333 and connects on the left with by-pass line 315, with line 313 to high valve 230 and with a power line 433 which connects, as do all the power lines, with pressure pump outlet line 38 in Fig. 1. On the right, valve 260 connects with a drain line 339 and with a recess 329 which is connected with the front clutch line 59 (Fig. 1).

Bypass line 315 is connected with a line 338 (dotted) which has a one-way valve and provides a free flow of oil from a conveniently placed reservoir in the casing 300 to fill dashpot 336. The upper end 336 of cylinder 251 forms a dashpot closed by a screw plug 321 fitted with a stop 322 which serves to limit the upward movement of valve 250.

Dashpot 336 has two outlets. The first, which becomes operative when the vehicle is starting to move, is a restricted orifice 327 which opens to a drain line 328 and is regulated by an adjustable needle 325. The second outlet is a line 341 regulated by an adjustable screw 326 and is connected to re-set valve 280. Said second outlet, through line 341, slot 356 and drain line 358 becomes operative at higher speeds of the vehicle whenever valve 280 becomes actuated downward by pressure applied through line 314.

Reversal valve 270 is a piston housed in cylinder 272, bored in block 300 and closed by screw plug 348. A lateral passage 375 in block 300 admits an actuating arm 373 for the operation of valve 270 (Figs. 3 and 4). Valve 270 is fitted with slots 345, 346 and 347, and with a central bore 344 which permits free passage of fluid during the actuation of the valve. Slot 345 closely embraces the rounded head 340 of an arm 373 which is integral with shaft 372, operably supported in brackets 376 attached by studs 377 to the transmission casing 399 and transmitting the movement of prongs 371 which frictionally grasp a tapered flange 370 of brake drum 121 (Fig. 1).

Valve 270 connects on the left with a recess 357 which opens to front brake line 271, with a drain 374 and with a line 342 conveying fluid pressure to chamber 331 for the upward actuation of brake gearlock valve 250. On the right, valve 270 is connected by lines 350 and 360 with re-set valve 280.

Re-set valve 280 is a piston housed in a cylinder 281 bored in block 300 and is fitted with annular slots 352, 353 and 356. A spring-biased ball 361 in a bore 362 on the lower end of valve 280 registers in annular slots 363 and 359 formed in the wall of cylinder 281 and serves to act as a detent at either end of the travel of valve 280, if the pressure is the same in both chambers 367 and 281. Chamber 367 which forms the upper portion of cylinder 281 receives pressure from line 314 when valve 280 is to be actuated downwardly.

On the left, valve 280 connects with drain lines 355 and 358, and with a line 316 to the high valve 230.

On the right, valve 280 connects with reversal valve 270 through lines 350 and 360, and by line 341 with the gearlock dashpot 336.

The lower portion of cylinder 281 is connected with centrifugal valve 290 by line 305, and is closed by screw plug 366 which carries an upwardly extending stop 365.

In Fig. 5 the operation of valve shaft 290 is shown. The driven tailshaft 125 actuates a cross shaft 374 through a worm gear 265 to rotate the centrifugal mechanism 386 which is fitted with a one-way clutch 387 located between collars 379 integral with shaft 374. Clutch 387 serves to operate the centrifugal device 386 in forward drive but is inoperative when tailshaft 125 is rotating reversely. Angle arm 388 fulcrumed at 389 operates rod 392 working in supports 394 and fitted with teeth 393 to rotate shaft 290 through shaft teeth 391.

Valve 290 has a central bore 432 which serves to convey fluid pressure from power line 38 through port 302 to line 303, or to lines 304 and 305, in accordance with the speed of the vehicle. Valve 290 has a reduced area 299 which opens to drainage and serves to drain lines 303, 304 and 305 when they are not registering with port 302. At starting, and up to a vehicle speed of 3 M. P. H., port 302 opens power line 38 to lines 304 and 305, after which it becomes closed upon clockwise rotation of 290 and lines 304 and 305 are drained. Line 303 is drained until the speed reaches 50 M. P. H. when port 302 registers with it to supply fluid pressure for the actuation of valve 230 by the oil admitted to chamber 297.

The association of the hand brake 410 with the rear clutch control line 131 and with the electric starter 403 is shown in Fig. 8. The brake handle 410 has three additional functions: (a) To mechanically free the front clutch 74 through collar 87 and arm 92 fulcrumed at 93. (b) To engage the rear clutch 138 by opening line 131 to drain 309 by the mechanical rotation of shaft 310 through arm 461 and link 460. (c) To make the electric starter 403 operative by current from battery 401 by the closure of switch 404 through arm 374 when the hand brake is applied. The starting of the engine would then be determined by the use of the usual starter switch.

While an extensive valve assembly, functioning to control a transmission having two planetary gearsets is being described, it will be appreciated that the valve mechanisms herein would be operative to regulate a transmission in which only one planetary gearset is provided.

Fig. 14 is a vertical section through block 300 along the line B—B in Fig. 2 to show the connection of one-way feeder line 338 from a reservoir 398 on casing 399 to by-pass line 315. A plug 429 threaded in casing 399 is fitted with a spring-biased ball and allows free flow of oil from reservoir 398 into line 338 but stops any outward flow therefrom.

In Fig. 8, hand brake 410 fulcrumed at 416 and held by ratchet 476 operates an arm 374 to close a switch 404 when the hand brake 410 is applied. Current from battery 401 may then be passed to starter 403 when the operator closes the usual starter switch 402.

When hand brake 410 is applied it actuates link 460 and arms 461 and 462 carried by shaft 310 (Fig. 2) to move cross-bar 463 which swings on hinge 466. Through link 464 and arm 465 shaft 93 is rotated to disengage the front clutch by means of arm 92 (dotted) shown in Fig. 1. At the same time cross-bar 463 operates link 467 and angle member 468 carried on shaft 469 to rotate arm 470 carried by shaft 441 to apply the rear brake (Fig. 15).

For towing and push start wherein the rear brake must be held off, cam 472 carried on shaft 475 is operated through link 474 and a manual control member 471, fulcrumed at 473, to abut against arm 470, and thus to keep the said rear brake disengaged.

To lessen the drag on the transmission caused by the engine-driven pump which provides pressure for the various controls, a mechanism referred to as the "power relief" may be fitted to become operative in direct drive, i. e. top gear. In the transmission shown in Fig. 1 the front clutch and the rear clutch are spring-engaged and the front brake is disengaged by spring so that in a top gear setting of the selector valve 200 the only member affected by a substantial fall in fluid pressure would be the rear brake. The rear brake is normally spring-biased to engagement and special provision must be made for a lowering of the said pressure either by the use of an extra large brake-operating cylinder or of leverage sufficient to compensate for the reduction of pressure. A third method resides in the mechanical locking out of the rear brake while the normal pressure, e. g., 90 lbs. to the inch, is still operative. This is the method shown in Fig. 15.

If the rear brake is applied while the rear clutch is disengaged the rear planetary gearset operates to provide a gear reduction but the rear clutch must be engaged to brake the car.

In Fig. 15 brake band 163 is applied to brake drum 158 by spring pressure, from shaft 454 through lever arm 440 fulcrumed at 441, applied by spring 436 to the slotted end 416 of the band 163. Spring 439 biases band 163 to the off position. Shaft 454 has a disc-like collar 438 and is integral with piston 437 which is moved in one direction in cylinder 382 by spring 436 and in the other direction by fluid pressure passing through line 224 into chamber 455. A cylinder 453 houses a piston 443 integral with an upwardly extending shaft 442 and piston 443 is moved in the one direction by fluid pressure from line 383 passing into chamber 456 while it is normally biased in the other direction by spring 444. A port 452 in the wall of cylinder 453 is uncovered by the upward actuation of piston 443 and opens to an escape valve 451 which is fitted with a ball 447 biased by spring 448.

When the rear brake 163 is held off by pressure in chamber 455 the collar 438 is clear of shaft 442 and if power relief is not in operation piston 443 is spring actuated to the lower end of cylinder 453. Now, if pressure is opened to the power relief line 383 piston 443 is moved upwards and shaft 442 intercepts collar 438 to prevent the application of band 163. On further upward movement piston 443 uncovers port 452 to allow escape of pressure past ball 447. With power relief in operation the hand brake may still be used to check the vehicle, shaft 441 being rotated to carry its attached arm 440 away from the end of shaft 454 to apply brake band 163, through its slotted end 416, to drum 158.

Fig. 12 is a plane projection showing diagrammatically the drainage and pressure slots and ports on the surfaces of valves 200 and 210. Dotted ports 232, 233, 234, 235, 274, 217, 430, 275, 276 and 278 indicate the ends of the conduits similarly numbered in Fig. 2, the diagram showing the valve 200 as located in the Low Automatic position. At the top of the figure, R indicates the vertical line of slots operative in reverse, 1 2 3 4 indicate the positions in the four forward gear ratios, N is neutral and H and L stand for High and Low automatic drive positions. The numeral 259 with arrow points out the horizontal lines of ports and slots which become operative in a kick-down gear change. Slot 359 and 203 and chamber 228 which are not subject to pressure and open to permanent drainage are shown with horizontal fluid lines. Plain slots 397 are those open permanently to power and the vertically lined ports 396 indicate bores communicating the surface slots 397 to the central power bore 204. Valves 250 and 260 are for convenience housed in the same cylinder since they share in common the gear-locking function serving to close the outlet to drainage of line 55 from the planetary pump formed by gears 111 and 116 in Fig. 1.

High valve 230 is a safety valve only, serving to prevent the use of a lower than top ratio when the speed of the vehicle reaches 50 M. P. H.

Operation

The actuation of the foregoing mechanisms will be reviewed.

Selector valve 200 and F. W. valve 220 are spring biased in the one direction and mechanically operated in the other.

Reversal valve 270 is mechanically operated in each direction.

Centrifugal valve 290 and hand-brake valve 310 are rotated mechanically in either direction.

High valve 230, low valve 240, and gearlock valves 250 and 260 are spring biased in the one direction and hydraulically actuated in the other.

Re-set valve 280 is fluid operated in each direction.

Brake gearlock valve 250, reversal valve 270 and re-set valve 280 co-operate with the front brake drum 121 in the control of front brake application.

Gearlock valve 260 operates only in connection with the front clutch 74 and provides gearlock by carrying valve 250 with it in its upward movement.

Selector valve 200 turns on pressure through line 314 to chamber 335 for the engagement of the front clutch 74 but said engagement is actually determined by drainage through lines 59, 313 and 314.

Selector valve 200 in Automatic drive turns on pressure to actuate gearlock valve 260 but at the same time passes power through line 313 to line 59 so that the front clutch 74 remains disengaged.

The front brake 122 is spring biased to disengagement and applied by fluid pressure and holds the front sun gear 116.

The rear brake 162 is spring biased to engagement and disengaged by fluid pressure and holds an annulus 159 in the rear planetary gearset.

The front clutch 74 is spring biased to engagement and released by fluid pressure or mechanically by the hand brake 410. It acts to directly connect the drive shaft 65 to the intermediate shaft 67.

The rear clutch 74 is spring biased to engagement and disengaged by fluid pressure. Its action is indirect, serving to connect two members of the rear planetary gearset, the annulus 159 and the sun gear 157, to lock said gearset and thereby to connect the intermediate shaft 67 to the driven shaft 125 for unitary rotation.

In First gear, both brakes 122 and 162 are applied and both clutches 74 and 138 are free.

In Second, the front clutch 74 and the rear brake 162 are engaged only.

In Third, the front brake 122 and the rear clutch 138 are engaged.

In Top Gear, both clutches 74 and 138 are engaged and both brakes 122 and 162 are free.

In Fig. 2 the valves are shown in normal position with the engine not running and the selector valve 200 in Neutral.

For starting the engine the hand brake 410 must be applied to close the switch 404 and at the same time to mechanically disengage the front clutch 74 through lever 92. When the engine starts drive shaft 20 transmits the drive to annulus 117 and through planets 111 the sun gear 116 is rotated backwardly with brake drum 121. Flange 370 carries prongs 371 upward and arm 373 downward (Fig. 4) to move reversal valve 270 to its lower position. Pressure from governor valve line 432 moves low valve 240 down and re-set valve 280 upward.

To start in 1st gear

The power and drainage supplied by selector valve 200 in the gear settings are shown in Fig. 13. In 1st gear pressure is passed through port 206, line 232, slot 257, line 263, slot 292, line 316, slot 353, line 350, port 369, slot 347 and line 342 to chamber 331 to move brake gearlock valve 250 slowly upwards forcing oil through needle-restricted orifice 327 into drain line 328. This flow however does not occur until F. W. valve 220 is moved up by spring 261 when the throttle 400 is depressed and arm 252 swings away from extension 247. While valve 220 is down and free-wheeling in operation line 232 is closed and line 263 open to drain line 237 through slot 257, and line 264 open to slot 258 and drain 238.

Valve 250 moving upwardly gradually shuts off the escape of oil from planetary pump line 55 through slot 330 to drain line 318. The slow closure of line 55 progressively retards the rotation of the gear members 111 and 116 forming the planetary pump, the rate of closure being determined by the shape of port 306 and the degree of restriction provided by needle 325.

When the engine is idling the brake drum 121 connected with the sun gear 116 is rotated backwardly at about 1½ times the engine speed, and as the gearlock effect increases, the planet gear carrier and intermediate shaft, 109 and 67, are rotated with increasing speed while brake drum 121 slows down until it becomes stationary and then rotates forwardly with the engine shaft 20.

With the first forward revolution of drum 121, prongs 371 frictionally embracing flange 370, rotate shaft 372 so that arm 373 and its head 340 are swung upwards to move reversal valve 270 to its upper position, closing port 369 and line 360 while opening port 368 and line 350 to supply pressure through slot 346 and recess 357 to the front brake line 271 to apply front brake band 123.

Upward movement of valve 270 also serves to open chamber 331 through slot 347 to drain line 374 and valve 250 is at once moved down to original position by spring 337 while chamber 336 fills again rapidly with oil through by-pass 315 and reservoir line 338 (Fig. 14). When the engine started, low valve 240 was moved downwardly by pressure from line 432 through port 302 and line 304 to chamber 269 and opened the rear brake line 224 through recess 285 and slot 282 to line 275 for which valve 210 was set to supply drainage so that the rear brake 162 became spring-applied.

Meanwhile, selector valve 200 has opened drainage to the escape line 278 through slots 395 (see Fig. 12), port 207, line 233, slot 258, line 264, slot 293 to chamber 335 so that clutch gearlock valve 260 remains in its normal position wherein power line 433 through slot 333 and recess 329 supplies pressure to line 59 to keep the front clutch 74 disengaged.

Selector valve 200 also opened pressure through the central bore 204, a lateral port 396, a surface slot 397 (see Fig. 12), port 209, line 235, slot 295, line 307 and bore 306 to line 131 to release the rear clutch 138. Now, with both clutches 74 and 138 free and both brakes 122 and 162 applied, the car is moving off in first gear.

Since the drum reversal above described takes an appreciable time the rear brake 162 is applied before the front brake 122 is put on and the gradual closure of line 55 increasingly checks the rotation of the gears 111 and 116 forming the planetary pump so that a "clutch effect" is provided. In a start in first or third gear the said clutch effect increases until the front brake drum 121, which in Neutral was being rotated backwardly, becomes for an instant stationary. At that moment the transmission is in the same condition as if said drum were being held by the front brake instead of being retarded by the locking of the planetary pump. Then as the clutch effect continues the brake drum 121 begins to rotate forwardly in the same direction as that of the engine. With the first forward revolution the "reversal" arm 371 is operated and valve 270 at once supplies pressure through conduit 271 to immediately apply the front brake 122. Third or first gear is then operative, depending on the setting of the controls in the rear unit.

*To start in 2nd gear*

In the second gear setting selector valve 200 supplies pressure to lines 233 and 235 while providing drainage for lines 232, 234, 274 and 275 (Fig. 13). The front clutch 74 and the rear brake 162 are engaged and the rear clutch 138 and the front brake 122 disengaged.

Pressure in line 233 is passed through slot 258, line 264, slot 293, line 314 to chamber 335 to move clutch gearlock valve 260 upwardly. Line 314 also supplies pressure to chamber 367 to act on head 351 of valve 280. Re-set valve 280 however has been moved up by pressure in chamber 281 through line 305 from centrifugal valve bore 432 when the engine started. As the pressure is still present in chamber 281 re-set valve 280 remains in its upper position with the ball 361 anchored by annular slot 359. Line 341 is closed off so that the flow from chamber 336, the dashpot portion of cylinder 320, is limited by needle 325.

Gearlock valve 260, moving upward, bears against valve 250 causing the latter to progressively close line 55 serving to check the rotation of the gears 111 and 116 which form the planetary pump. With the closure of pump line 55 the gearlock valve 260 opens the front clutch line 59 through slot 333, slot 294 and conduit 234, to the drain slot 208 in selector valve 200 and the front clutch becomes engaged by springs 105.

In a start in first or third gear the front brake 122 is applied when the closure of line 55 is far from complete but in a start in second or top gear the front clutch 74 is not engaged until line 55 is closed or nearly closed.

The front clutch 74 is normally disengaged by fluid pressure from line 38 through line 433, slot 333, recess 329 and line 59.

As valve 260 moves upward it closes off line 433 and, when said closure is more or less complete, line 59 opens through slot 333, line 313, slot 294 and line 234 to a port in valve 200 which opens to drainage and allows the engagement of the front clutch 74. The upward movement of valve 260 may be accelerated at a desired point by opening dashpot 336 through by-pass 315 and slot 332 to drain line 339. For the prevention of wear on the clutch plates it would be preferred that the front clutch 74 would not be engaged until the closure of the planetary pump line 55 is complete or nearly so.

The rear brake is disengaged by drainage supplied by valve 210 to line 275, slot 282, recess 285 and rear brake line 224, valve 240 having moved downward when the engine started.

In third gear the front clutch 74 and the rear brake 162 are free while the front brake 122 and the rear clutch 138 are engaged. Valve 200 drains lines 233 and 235 while supplying pressure to lines 232, 274 and 275. The disengagement of the front clutch 74 and the application of the front brake 122 is as described in a start in 1st gear, the rear clutch 138 being first engaged by spring pressure, drainage being supplied by selector valve 200 through line 235, slot 295, line 307 and bore 306 to rear clutch line 131. The rear brake 162 is held off by pressure from valve 200 through line 275, slot 282, recess 285 and line 224.

*To start in high gear*

The selector valve 200 furnishes drainage to lines 232, 234 and 235, and pressure to lines 233, 274 and 275. Both clutches 74 and 138 are engaged and both brakes 122 and 162 free. The engagement of the front clutch 74 is as described for start in 2nd gear and of the rear clutch 138 as in 3rd gear. Freeing the rear brake 162 is described in 3rd gear start and of the front brake 122 in 2nd gear start.

Free-wheeling is provided by valve 220 which frees the front clutch 74 by pressure and the front brake 122 by drainage as previously described.

Kick-down gear change occurs when the throttle pedal 400 is fully depressed and lever arm 254 moves valve 200 downward bringing a new level of power slots and drains into co-operation with lines 232, 233, 234, 235 and 274. While any gear reduction may be furnished as desired it is preferred construction for kick-down operation to provide a change from high to 3rd, from 3rd to 2nd, from 2nd to 1st, while 1st would remain unchanged. High Automatic ratio would conveniently be changed into 3rd, and Low Automatic ratio into 1st gear.

In kick-down from high to 3rd speeds the engine accelerates as soon as the front clutch 74 is free, the front brake drum 121, which was turning at engine speed, becomes slowed to a stop and then begins to rotate backwardly, the reversal operating to apply the front brake 122.

In both Low and High Automatic ratio settings of the selector valve 200 the front brake 122 and the front clutch 74 are disengaged and the torque line 44 opened to flow escape through port 259, chamber 228 and drain line 217. In High Automatic ratio setting the rear clutch 138 is spring-engaged and the rear brake 162 held disengaged by pressure. In Low Automatic ratio the rear brake 162 is spring-applied and the rear clutch 138 held disengaged by fluid pressure.

In Neutral up to 3 M. P. H. drainage is supplied by low valve 240 to the rear brake 162 through line 275, but over that speed, line 275 is closed and valve 200 furnishes pressure through line 274 to hold the rear brake 162 from application.

In a change from 1st to 2nd gear the front clutch 74 is engaged, pressure in chamber 335 moving valve 260 up, and front clutch line 59 receives drainage through recess 329, slot 333, line 313, slot 294 and line 234. At the same time the rear brake 162 remains engaged but re-set valve 280 is moved downwardly by pressure from line 314 to chamber 367 and opens drainage to the front brake 122 through recess 357, slot 346, line 350 and slot 352 to drain line 355, so that the front brake 122 is disengaged. The downward movement of valve 280 re-sets the lines 350 and 360 for the next reversal by valve 270 which will move valve 270 downwardly and line 360 will act to provide power to the front brake 122 from line 316 through slot 353.

In 2nd and high gear the drive shaft 20 and the intermediate shaft 67 are clutched and the front planetary gearset is rotating as a unit with them so that the front brake drum 121 is rotating forwardly at engine speed. In a change from high to 3rd, from 2nd to 3rd, or from 2nd to 1st the front clutch 74 is free and the gears 116, 111, 117 of the front planetary set operate in a low ratio drive.

When the unitary condition referred to ceases with the disengagement of the front clutch 74, the engine shaft 20 at once tends to accelerate while the front brake drum 121 loses its forward rotation to finally rotate backwardly. With the first backward revolution of the brake drum 121 reversal valve 270 is moved downward and the front brake 122 applied, this time, by pressure through line 360 instead of line 350, which was operative for starting.

The front brake 122 and the front clutch 74 are never operative together but they are both disengaged at the same time in Automatic drive and in Free-wheeling. The rear brake 162 and the rear clutch 138 are both engaged when the vehicle is being braked.

While there has been described what at present is considered a preferred embodiment of the invention, it will be appreciated by those skilled in the art that various changes and modifications can be made therein without departing from the essence of the invention which resides in the construction, combination, and arrangement of the various parts described, and defined in the claims. The invention is intended to cover all such changes and modifications as come within the true spirit and scope of the claims which now follow.

What is claimed is:

1. In a power transmission in a motor vehicle, in combination; a drive shaft and a driven shaft; an engine-driven pump for a supply of fluid pressure; a planetary gear assembly serving to provide a gear reduction in the drive between said shafts; clutch means to connect said shafts for unitary rotation; hydraulic mechanism in association with said clutch; brake means serving to check the rotation of a gear member of said assembly; hydraulic mechanism in association with said brake; valve means serving to route pressure and drainage to the said hydraulic mechanisms in the operation of said clutch and said brake; a handle controlled by the operator and a connection from said handle serving to transmit rotary movement to an element of said valve means; and an accelerator pedal serving to transmit reciprocating movement to said element; wherein the first said valve means is divided into relatively movable sections, one of said sections receiving only rotary movement from said handle while another said section receives rotary movement from said handle and reciprocating movement from said accelerator pedal.

2. In a power transmission in a motor vehicle, in combination; a drive shaft and a driven shaft; a source of fluid pressure; planetary gearing serving to provide a modified ratio in the drive between said shafts; clutch means serving to operably connect said shafts for unitary rotation; hydraulic mechanism associated with said clutch means; brake means serving to check the rotation of a gear member of said planetary gearing; hydraulic mechanism associated with said brake means; a handle and a throttle pedal controlled by the operator of the vehicle; a first valve means actuated by said handle and serving to set the supply of fluid pressure and of drainage to said hydraulic mechanisms; said setting determining the gear ratio in the drive between said shafts; a second valve means, mechanism actuated by said pedal and serving at one end of its movement to operate said first valve means to provide a lower gear ratio than that originally set by said first valve means; and at the other end of its movement to operate said second valve means to disengage said clutch means to provide a free drive shaft; said pedal-actuated mechanism having an intermediate range wherein the gear-selecting control is restored to said handle.

3. In a power transmission in a motor vehicle, in combination, a drive shaft, an intermediate shaft, and a driven tailshaft; an engine-driven pump supplying fluid pressure; a clutch serving to connect said drive shaft and said intermediate shaft for unitary rotation; a planetary gear assembly serving to provide a gear reduction in the drive between said drive shaft and said intermediate shaft; a brake to check the rotation of a brake drum connected with a gear member of said assembly; a second planetary gear assembly serving to provide a gear reduction in the drive between said intermediate shaft and said driven tailshaft; a clutch associated with said second assembly serving to connect two members of the said second assembly to lock the latter and to connect said intermediate shaft to said tailshaft for unitary rotation; a brake to check the rotation of a gear member of said second assembly to provide a gear reduction in the drive between said intermediate shaft and said tailshaft; hydraulic means in connection with each said clutch and each said brake; some of the gears in said first assembly being enclosed to act as a fluid pump; valve means serving to restrict the flow of fluid from said latter pump; said restriction serving to check the rotation of the gear members of said first assembly to provide a variable degree of clutching between said drive shaft and said intermediate shaft; and a hand brake acting to mechanically disengage the first said clutch and mechanically apply the second said brake; said hand brake when applied serving to actuate valve means to drain the hydraulic mechanism in connection with said second clutch and thereby cause said latter clutch to become engaged.

4. A power transmission as set forth in claim 3, including; an electric starter; a circuit in connection with said starter; a starter-switch in said circuit; and a second switch in said circuit which is closed by said hand brake when the latter is applied and opened when said hand brake is released.

5. In a power transmission in a motor vehicle, in combination; a drive shaft and a driven shaft; a source of fluid pressure; clutch means serving to operably connect said shafts for unitary rotation; a planetary gear assembly serving to provide a gear reduction in the drive between said shafts; gears in said assembly being enclosed to provide a fluid pump; a valve serving to restrict the flow of fluid from said latter pump; a rotatable member connected with a gear member of said assembly; a brake to check the rotation of said rotatable member; the said flow restriction serving to check the rotation of the gear members forming said latter pump and thereby to provide a clutching action between said shafts varying according to the degree of said restriction; hydraulic mechanism employing fluid pressure for the actuation of said valve means; a spring biasing said valve to an original position; a dashpot fitted with an adjustable outlet controlling the movement of said valve away from original position; hydraulic mechanism actuated by fluid pressure and spring means in connection with the operation of said brake; and manual means to control the pressure and drainage for said hydraulic mechanisms.

6. A power transmission as set forth in claim 5, wherein said drive shaft is operative through said assembly to rotate said rotatable member backwardly when the said clutch means is free and flow from the latter said pump is unrestricted; and to rotate said rotatable member forwardly when either said clutch means or said latter pump is providing a clutching action; a second valve and a connection from said rotatable member to said second valve; said latter valve being operable to actuate said hydraulic mechanism to apply said brake when said rotatable member, after being initially rotated reversely, begins to rotate in the same direction as that of the said drive shaft said second valve serving also to actuate the first said valve to provide free flow from the second said pump at the same time that the said brake is applied.

7. A power transmission as set forth in claim 6, said latter valve means being operable to apply said brake when said rotatable member, which has been rotating forwardly, begins to rotate in the opposite direction to that of the said drive shaft.

8. In a power transmission in a motor vehicle, in combination; a drive shaft and a driven shaft; a source of fluid pressure; a clutch serving to connect said shafts for unitary rotation; a planetary gear assembly serving to provide a gear reduction in the drive between said shafts; gears in said assembly being enclosed to form a fluid pump; a brake and a rotatable member, said rotatable member being connected to a gear member of said assembly; said brake serving to check the rotation of said gear member; hydraulic mechanism in connection with said brake hydraulic mechanism in connection with said clutch; a first valve means serving to restrict the flow of fluid from said fluid pump and thereby to check the rotation of the gears forming said fluid pump and provide easier application of said brake; a second valve means serving to actuate to the first said hydraulic mechanism to apply the said brake; and a connection from the said rotatable member to said second valve means serving to actuate said latter valve means to apply said brake when said rotatable member reverses its direction of rotation.

9. A power transmission as set forth in claim 8, including; a dashpot in connection with the first said valve means and an adjustable outlet from said dashpot; and spring means biasing the first said valve means to original position.

10. A power transmission as set forth in claim 9, including; a conduit opening to said dashpot and fitted with a one-way valve and serving to allow rapid return of first said valve to its original position; a third valve; and a second adjustable outlet connecting said dashpot with said third valve; said latter outlet being opened when said clutch becomes engaged and said third valve becomes actuated to a new position.

11. In a power transmission in a motor vehicle, in combination; a drive shaft and a driven shaft; a source of fluid pressure; a clutch serving to connect said shafts for unitary rotation; a planetary gear assembly serving to provide a gear reduction in the drive between said shafts; spring means and hydraulic mechanism in connection with said clutch; gears in said assembly being enclosed to form a fluid pump; valve means serving to restrict the flow of fluid from the latter said fluid pump and so to variably check the rotation of the gears forming said pump to a degree corresponding to the degree of said restriction; said restriction when fully operative serving to bring the speed of the said driven shaft almost to that of the said drive shaft; said valve means also serving to cause engagement of said clutch when the difference in speed of rotation of the said shafts has been reduced to the lowest possible point.

12. A power transmission as set forth in claim 11, wherein; said valve is first made operable by manual control and thereafter becomes actuated by fluid pressure; and an adjustable resistance to the movement of said valve serving to slow its action when the vehicle is starting from a stationary position.

13. A power transmission as set forth in claim 12, including; further valve means serving to lessen the said resistance and thus to provide more rapid actuation of said valve when the vehicle is moving at an appreciable rate of speed.

14. In a power transmission, in combination; a drive shaft, an intermediate shaft and a driven tailshaft; a front planetary gear assembly including a plurality of members adapted to connect said drive shaft and said intermediate shaft in a modified drive relation; gear members in said assembly being enclosed to form a fluid pump; control means serving to regulate the flow of fluid from said pump thereby providing a variable degree of fluid clutching between said shafts; a source of fluid pressure; front clutching means serving to connect said drive shaft and said intermediate shaft; spring means and hydraulic mechanism in association with said clutching means; a front brake serving to check the rotation of a member of said gear assembly; spring means and hydraulic mechanism in association with said front brake; a rear planetary gear assembly including a plurality of members and serving to connect said intermediate shaft and said tailshaft in a modified drive relation; rear clutching means serving to connect said intermediate shaft and said tailshaft; spring means and hydraulic mechanism in association with said latter clutching means; a rear brake serving to check the rotation of a member of said rear assembly; spring means and hydraulic mechanism in association with said rear brake; a manually-controlled valve means supplying drainage and pressure for said hydraulic mechanisms and serving to selectively engage said front and rear brakes and said front and rear clutching means to provide four forward gear ratios in the drive through said transmission; a centrifugal mechanism in connection with said tailshaft; a second valve means; said second valve means being operably connected with said centrifugal mechanism and actuated by it, on reaching a pre-determined speed, to cause engagement of both said clutching means and to free both said brakes, and thus to provide a direct drive through the transmission.

15. In a power transmission, in combination; a drive shaft and a driven shaft; a source of fluid pressure; clutching means serving to connect said shafts; a planetary gear assembly including a plurality of members adapted to connect said shafts in a modified drive relation; a rotatable member and a brake serving to check the rotation of said rotatable member a connection from said rotatable member to a member of said assembly; said drive shaft being operable through members of said assembly to rotate said rotatable member forwardly when said clutching means is operative and to rotate said rotatable member backwardly when said clutching means is free; hydraulic mechanism and spring means in connection with said brake; manually operated valve means forming a gear ratio selector; a second valve and a third valve; each of said two latter valves being operable to a first position and a second position; fluid connections from said selector valve means through said second valve and said third valve to said hydraulic mechanism; a connection from said rotatable member to said third valve serving to actuate the latter to its first or to its second position according to the direction in which said rotatable member is rotating; means to actuate said second valve to its first position when the engine starts running and fluid pressure becomes available; and means causing said second valve to be actuated to its second position when the vehicle is moving at appreciable speed; the hydraulic connections from said selector valve to said hydraulic mechanism being operable to apply said brake when said first and second valves are both in their said first position or both in their said second position.

16. In a power transmission, in combination; a drive shaft and a driven shaft; a source of fluid pressure; a planetary gear assembly including a plurality of members adapted to connect said shafts in a modified drive relation; clutching means serving to connect said shafts; hydraulic mechanism in association with said clutching means; members of said assembly being enclosed to form a fluid pump; means to restrict the flow from said pump; a brake and a brake drum; said drum being connected to a member of said assembly; hydraulic mechanism in association with said brake; manually actuated valve means serving to control both of said mechanisms and said restricting means; a pedal accelerator; further valve means having fluid connections with first said valve means; said accelerator being operable to actuate said further valve means and serving, when fully released, to cause said further valve means to disengage said clutching means and said brake and at the same time provide free flow from said pump; thereby furnishing a free running engine and drive shaft.

17. In a power transmission, in combination; a drive shaft and a driven shaft; a source of fluid pressure; a planetary gear assembly including a plurality of members adapted to connect said shafts in a modified drive relation; a brake and a rotatable member; said rotatable member being operably connected with a member of said assembly; hydraulic mechanism in connection with said brake; clutching means serving to check relative rotation between members of said assembly; said drive shaft being operable through members of said assembly to rotate said rotatable member backwardly when said clutching means is free and forwardly when said clutching means is in operation; a first valve and a second valve; each said valve being operable to a first and to a second position; a connection from said rotatable member to the said first valve, serving to actuate said latter valve to its first or its second position according to the direction in which said rotatable member is being rotated; a fluid connection from said first valve to said hydraulic mechanism; means serving to actuate said second valve to its first position when the engine starts running and fluid pressure is made available; means to actuate said second valve to its second position when the vehicle is moving at appreciable speed; fluid connections between said valves; said first valve being operable to control said mechanism to cause application of said brake when both said valves are in the said first position or both in the said second position; and fluid connections from the said second valve to fluid pressure and to drainage.

18. In a power transmission, in combination; a drive shaft and a driven shaft; a source of fluid pressure; a planetary gear assembly including a plurality of members adapted to connect the said shafts in a modified drive relation; a brake and a rotatable member; said rotatable member being connected with a member of said assembly; spring means in association with said brake, and hydraulic mechanism serving to oppose said spring means; clutching means serving to check relative rotation between members of said assembly; said drive shaft being operable thru members of said assembly to rotate said rotatable member backwardly when said clutching means is free and forwardly when said clutching means is in operation; hydraulic means in association with said clutching means; a first valve means serving to control the said hydraulic mechanism; a second valve means serving to control the said hydraulic means; said first valve means being hydraulically connected to said second valve means a connection between said rotatable member and said first valve means; said latter connection serving while said brake is free from said drum to actuate said first valve means and said hydraulic mechanism to cause application of said brake when said rotatable member, which has been rotating in one direction, commences to rotate in the opposite direction; said second valve means operating to free said clutching means when said first valve means causes the application of said brake.

19. In a power transmission, in combination; a drive shaft and a driven shaft; a source of fluid pressure; planetary gearing serving to provide a plurality of gear ratios in the drive between said shafts; gear members in said planetary gearing being enclosed to form a fluid pump; control means serving to regulate the flow of the fluid from said pump and thereby to provide a variable degree of fluid clutching between said shafts; brake means in connection wtih said gearing serving in the provision of said gear ratios; hydraulic mechanism and spring means in connection with said brake means; clutching means operable to connect said shafts in the provision of said gear ratios; hydraulic mechanism and spring means in connection with said clutching means; a first valve means serving to set a gear ratio by controlling the supply of fluid pressure and of drainage to said hydraulic mechanisms; an operator's handle serving to actuate said first valve means; an operator's throttle pedal; a second valve means in association with said first valve means, made operative by a connection from said pedal and serving, when said pedal is depressed to a predetermined position, to change the said supply of fluid pressure and drainage to said hydraulic mechanisms as set by the first said valve means; and thereby to provide a down change in the gear ratio existing between said shafts; spring means biasing said second valve means to an original position; the control of said hydraulic mechanisms being returned from said second valve means to said first valve means when said pedal is released to a position of lesser throttle opening and said latter spring means returns said second valve means to its original position.

20. A power transmission as set forth in claim 19: wherein said planetary gearing includes a front planetary assembly and a rear planetary assembly and serves to provide three or more gear ratios in the drive between said shafts; said second valve means being operative to provide, in each of the said gear ratio settings, a kick-down change to the next lower gear ratio, when the said pedal is depressed to the said predetermined position.

21. In a power transmission in a motor vehicle, in combination; a drive shaft and a driven shaft; a source of fluid pressure; planetary gearing serving to provide a plurality of gear ratios in the drive between said shafts; gear members in said planetary gearing being enclosed to form a fluid pump; control means serving to regulate the flow of fluid from said pump and thereby to provide a variable degree of fluid clutching between said shafts; braking means in connection with said gearing serving to provide a modified ratio in the said drive; clutching means operable to connect said shafts; hydralulic mechanism in connection with said braking means and said clutching means; an operator's gear control handle and a throttle pedal; a first valve means actuated by said handle; a second valve means and a third valve means, actuated by the operator through said throttle pedal; hydraulic connections between the different said valve means and the said hydraulic mechanisms; said first valve means serving to control the supply of fluid pressure and of drainage to the said hydraulic mechanisms and thereby to provide the said plurality of gear ratios; said pedal, when moved to the fully released position, serving to actuate the said second valve means to disengage said clutching means and so to provide a condition of free-wheel in said transmission; and said pedal, when depressed beyond a predetermined position, serving to make said third valve means operative to provide a lower gear ratio in the said drive than that which is in operation when the said pedal is held at a point intermediate of said released and said depressed positions.

22. A power transmission as set forth in claim 21; wherein said planetary gearing includes a front planetary assembly and a rear planetary assembly and serves to provide three or more gear ratios in the drive between said shafts; said third valve means being operative, in each of the said gear ratio settings, to provide a kick-down change to the next lower gear ratio, when the said pedal is depressed beyond the said predetermined position.

23. In a power transmission in a motor vehicle, in combination; a drive shaft and a driven shaft; a source of fluid pressure; a planetary gear assembly serving to provide a modified drive between said shafts; a first clutching means serving to connect said drive shaft to a first gear member of said assembly; hydraulic mechanism and spring means in connection with said clutching means; brake means serving to check the rotation of a second gear member of said assembly; hydraulic mechanism and spring means in connection with said brake means; a second clutching means operable to connect said first gear member to said driven shaft and to lock said assembly as a unit; hydraulic mechanism and spring means in connection with said second clutching means; manually-operated valve means serving to control the supply of fluid pressure and of drainage to the said hydraulic mechanisms; a second valve means serving to control the hydraulic connection between said manually-operated valve means and the said hydraulic mechanism in connection with said second clutching means; and a hand brake acting to mechanically apply said brake means and to mechanically free the first said clutching means; said hand brake also serving, when applied, to actuate said second valve means to cause engagement of the said second clutching means.

24. A power transmission as set forth in claim 23 and including: an electric starter and a circuit in connection with said starter; a starter-switch in said circuit; and a second switch which is closed by said hand brake when the latter is applied and opened when said hand brake is released.

25. In a power transmission in a motor vehicle, in combination: a drive shaft and a driven shaft; planetary gearing serving to connect said shafts in a plurality of drive ratios; a pump supplying hydraulic pressure; clutching means operable to connect said shafts for unitary rotation; spring means serving to cause engagement of said clutching means; hydraulic mechanism serving for the disengagement of said clutching means; braking means serving to check the rotation of a gear member of said planetary gearing; spring means serving for the application of said braking means; hydraulic mechanism serving for the disengagement of said braking means; valve means serving to hydraulically control the operation of the said clutching means and the said braking means; hydraulically-operated means serving to lock the said braking means in the disengaged position when said valve means is operated to cause engagement of said clutching means for a direct drive through the transmission; said hydraulically-operated means serving, when it locks the said braking means in the disengaged position, to allow a substantial escape for the flow from said pump and thereby to appreciably lessen the hydraulic pressure and so to reduce the drag effect of said pump on the operation of the said transmission.

26. In a power transmission, in combination: a drive shaft and a driven shaft; a source of fluid pressure; a planetary gear assembly adapted to connect said shafts in a modified drive relation; a rotating member and a brake serving to check the rotation of said rotating member; a connection from said rotating member to a gear member of said assembly; clutching means serving to connect said shafts; said drive shaft being operable to rotate said rotating member in one direction when said clutching means is free and in the other direction when said clutching means is in operation; hydraulic mechanism and spring means in connection with said brake; valve means controlling said fluid pressure in the operation of said hydraulic mechanism; a connection from said rotating member to said valve means; said latter connection serving to actuate said valve means to cause application of said brake when said rotating member after rotating in one direction commences rotation in the opposite direction.

27. A power transmission as set forth in claim 26; wherein gear members of said assembly are enclosed to form a fluid pump; a second valve serving to restrict the flow of fluid from said pump; and thereby to check the relative rotation of the said gear members; said second valve being biased by a spring means to an original position and actuated away from said position by fluid pressure from first said valve means; said first valve, when actuated by said rotating member to a new position, serving to shut off the fluid pressure which operates the said second valve means away from an original position, thereby causing said second valve means to be returned to said original position wherein the flow from said pump is unrestricted.

28. In a power transmission in a motor vehicle, in combination: a drive shaft, an intermediate shaft, and a driven shaft; a source of fluid pressure; a first planetary gear assembly serving to provide a modified drive between said drive shaft and said intermediate shaft; gear members in said assembly being enclosed to form a fluid pump; clutching means serving to connect said drive shaft to said intermediate shaft; hydraulic mechanism and spring means in connection with said clutching means; brake means serving to check the rotation of a gear member of said assembly; hydraulic mechanism and spring means in connection with said brake means; a second planetary gear assembly serving to provide a modified drive between said intermediate shaft and said driven shaft; a second clutching means serving to connect said intermediate shaft and said driven shaft and to lock the said second assembly as a unit; hydraulic mechanism and spring means in connection with said second clutching means; a second brake means serving to check the rotation of a gear member of said second assembly; hydraulic mechanism and spring means in connection with said second brake means; a first valve means, manually operated and serving to control the supply of fluid pressure and of drainage to the said hydraulic mechanisms; a second valve means and centrifugal mechanism in connection with the said driven shaft serving to actuate the said second valve means; said latter means occupying an initial position when the car is stationary or moving forwardly at less than a predetermined speed; and actuated to a second position when the car exceeds said speed; said second valve means controlling the fluid flow between said first valve means and the hydraulic mechanism in connection with the said second brake means; said first valve means being so arranged that, in the neutral setting, and with the said second valve means in initial position, the said first valve means serves to free the first said clutching means and the first said brake means and to provide free flow from said pump while causing engagement of the second said clutching means and the said second brake means, thereby braking the vehicle and at the same time freeing the said drive shaft; and with said second valve means in the said second position, the said first valve means, in the neutral setting, serves to disengage the first said clutching means and both of the said braking means, and to provide free flow from said pump, so that the said drive shaft and the vehicle are both free.

29. In a power transmission in a motor vehicle, in combination: a drive shaft and a driven shaft; a source of fluid pressure; a first planetary gear assembly and a connection from said drive shaft to a member of said assembly; a second planetary gear assembly and a connection from a member of said first assembly to a member of said second assembly; a connection from a member of said second assembly to said driven shaft; gear members in one of said assemblies being enclosed to form a fluid pump; control means serving to regulate the flow from said pump and thereby to check the relative rotation of the gears forming said pump; and so to provide a varying fluid clutching between said shafts; said planetary assemblies serving to provide a plurality of gear ratios in the drive between said shafts; clutching means in connection with said first assembly and braking means serving to check the rotation of a member of said first assembly; hydraulic mechanism using said fluid pressure in the operation of said clutching means and of said braking means; clutching means in connection with said second planetary assembly and braking means serving to check the rotation of a member of said latter assembly; hydraulic mechanism using said fluid pressure in the operation of the latter said clutching means and braking means; a valve assembly serving for the control of fluid pressure and of drainage for the said hydraulic mechanisms in the provision of said gear ratios in the drive through the transmission; said valve assembly including a first valve means and a second valve means and hydraulic connections between these said valve means; an operator's hand control serving to actuate said first valve means to set a desired gear ratio in said transmission; and centrifugal mechanism in connection with said driven shaft serving to actuate said second valve means to provide a direct drive through said transmission when the said vehicle exceeds a predetermined speed.

30. A power transmission as set forth in claim 29; and an operator's throttle pedal serving to actuate said first valve means to provide a down change in the gear ratio, as set by the said valve assembly, when the said pedal is depressed beyond a predetermined position.

31. In a power transmission in a motor vehicle, in combination: a drive shaft and a driven shaft; a source of fluid pressure; a first planetary gear assembly and a connection from said drive shaft to a member of said assembly; a second planetary gear assembly and a connection from a member of said first assembly to a member of said second assembly; a connection from a member of said second assembly to said driven shaft; gear members in one of said assemblies being enclosed to form a fluid pump; control means serving to regulate the flow from said pump and thereby to check the relative rotation of the gears forming said pump; said planetary assemblies serving to provide a plurality of gear ratios in the drive between said shafts; clutching means in connection with said first assembly and braking means serving to check the rotation of a member of said first assembly; hydraulic mechanism using said fluid pressure in the operation of said clutching means and of said braking means; clutching means in connection with said second planetary assembly and braking means serving to check the rotation of a member of said second assembly; hydraulic mechanism using said fluid pressure in the operation of the latter said clutching means and braking means; a valve assembly serving for the control of fluid pressure and of drainage for the said hydraulic mechanisms in the provision of said gear ratios in the drive through the transmission; said valve assembly including a first valve means and a second valve means and hydraulic connections between these said valve means; and an operator's throttle pedal serving to actuate said first valve means to provide a down change in the gear ratio, as set by the said valve assembly, when the said pedal is depressed beyond a predetermined position.

32. A power transmission as set forth in claim 29; and an operator's throttle pedal serving to actuate said second valve means to provide a free-wheeling condition in said transmission when said throttle pedal is fully released.

33. In a power transmission, more particularly in a motor vehicle, in combination; a drive shaft and a driven shaft; planetary gear members serving to provide a modified drive between said shafts; a first means serving to check relative rotation between said gear members; a rotatable element connected with one of said gear members and capable of being driven through said gear members in the opposite direction of rotation to that of the said drive shaft; a second braking means serving to check the rotation of said rotatable element; a source of fluid pressure and hydraulic mechanism using said fluid pressure for the application of said second braking means; a connection from said rotatable element to said hydraulic mechanism; said latter connection becoming operative in the application of said second braking means when said first means by checking relative rotation between the said gear members causes said rotatable element to reverse its direction of rotation.

34. A power transmission as set forth in claim 33 wherein the first said braking means is provided by enclosing the said gear members to form a fluid pump the flow from which may be variably controlled.

References Cited in the file of this patent

UNITED STATES PATENTS

| | | |
|---|---|---|
| 1,365,112 | Line | Jan. 11, 1921 |
| 1,673,863 | Brown | June 19, 1928 |
| 2,144,270 | Palmgren | Jan. 17, 1939 |
| 2,221,393 | Carnegie | Nov. 12, 1940 |
| 2,343,955 | Cotterman | Mar. 14, 1944 |
| 2,352,212 | Lang | June 27, 1944 |
| 2,371,229 | Dodge | Mar. 13, 1945 |
| 2,404,623 | Dodge | July 26, 1946 |
| 2,407,289 | La Brie | Sept. 10, 1946 |
| 2,409,506 | McFarland | Oct. 15, 1946 |
| 2,507,051 | Roberts | May 9, 1950 |
| 2,516,203 | Greenlee | July 25, 1950 |
| 2,519,022 | Burtnett | Aug. 15, 1950 |
| 2,609,706 | Jandasek | Sept. 9, 1952 |
| 2,645,137 | Roche | July 14, 1953 |

FOREIGN PATENTS

| | | |
|---|---|---|
| 513,274 | Great Britain | Oct. 9, 1939 |